United States Patent [19]

Kiesel

[11] Patent Number: 4,729,044

[45] Date of Patent: *Mar. 1, 1988

[54] METHOD AND APPARATUS FOR PLAYING SERIALLY STORED SEGMENTS IN AN ARBITRARY SEQUENCE

[75] Inventor: Kenneth C. Kiesel, Wayland, Mass.

[73] Assignee: Lex Computing & Management Corporation, Keene, N.H.

[*] Notice: The portion of the term of this patent subsequent to Aug. 27, 2002 has been disclaimed.

[21] Appl. No.: 698,911

[22] Filed: Feb. 5, 1985

[51] Int. Cl.⁴ .......................... H04N 5/76; G11B 27/02
[52] U.S. Cl. ................................... 360/14.3; 360/14.1
[58] Field of Search .................... 360/14.1, 14.2, 14.3, 360/72.2; 369/30, 32

[56] References Cited

U.S. PATENT DOCUMENTS

| | | | |
|---|---|---|---|
| 3,721,757 | 3/1973 | Ettlinger | 360/14.3 |
| 4,528,600 | 7/1985 | Ishiguro | 360/14.1 |
| 4,538,188 | 8/1985 | Barker | 360/14.3 |

OTHER PUBLICATIONS

"Edit List Management" SMPTED Journal, Aug. 1979, pp. 538-542 by Schneider.
"Design Criteria of Video Post Production Systems with Optimum Operational Editing Convenience" SMPTE Journal, Jul., 1979, pp. 486-49 by Fix et al.

Primary Examiner—Alan Faber
Attorney, Agent, or Firm—Irving M. Weiner; Joseph P. Carrier; Pamela S. Burt

[57] ABSTRACT

A method for playing a plurality of segments, selected from a plurality of reference segments recorded on each of a plurality of video tape recorders in a known recorded sequence, provides for a continuous replay without the need for creating a master tape. The playback sequence, defined for example by an edit decision list, defines an order different than the order in which the reference segments have been recorded and typically represents all or part of a program. The method provides for playing successive segments with different tape recorders so that the various tape recorders have sufficient time to reach their next assigned segment. The method further provides for continuous replay of the program until interrupted by an external command.

9 Claims, 5 Drawing Figures

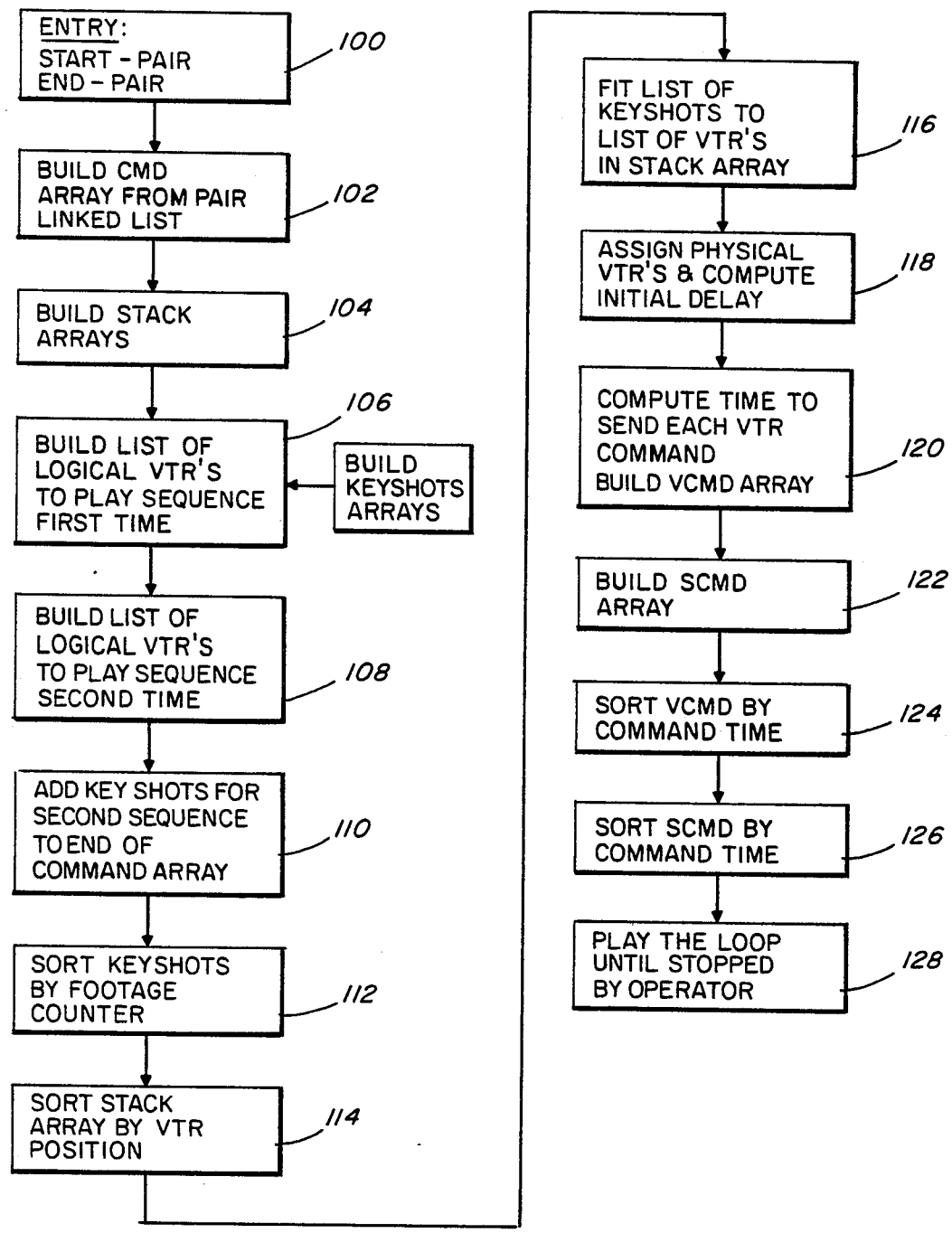
FIG. [2A-2C]

FIG. 3

PROGRAM SEQUENCE

| PROGRAM TIME | SHOT LENGTH | TIME CODE | MATERIAL |
|---|---|---|---|
| 00:00:00:00 | 00:00:05:28 | 00:19:59:18 | VIDEO |
| 00:00:05:05 | 00:00:02:15 | 00:16:40:27 | VIDEO |
| 00:00:06:13 | 00:00:02:27 | 00:14:00:03 | VIDEO |
| 00:00:08:27 | 00:00:07:17 | 00:07:07:04 | VIDEO |
| 00:00:09:04 | 00:00:08:10 | 00:12:51:08 | WILD AUDIO |
| 00:00:14:15 | 00:00:04:20 | 00:04:04:27 | VIDEO |
| 00:00:17:22 | 00:00:03:25 | 00:17:55:04 | VIDEO |
| 00:00:17:24 | 00:00:06:01 | 00:08:24:09 | WILD AUDIO |
| 00:00:20:00 | 00:00:08:09 | 00:03:02:07 | VIDEO |
| 00:00:26:06 | 00:00:07:00 | 00:00:59:10 | WILD AUDIO |
| 00:00:26:24 | 00:00:04:14 | 00:07:29:19 | VIDEO |
| 00:00:30:23 | 00:00:05:04 | 00:04 21:06 | VIDEO |
| 00:00:32:06 | 00:00:07:25 | 00:18:26:26 | WILD AUDIO |
| 00:00:35:05 | 00:00:06:19 | 00:10:37:29 | VIDEO |
| 00:00:38:13 | 00:00:05:10 | 00:03:03:03 | WILD AUDIO |
| 00:00:40:26 | 00:00:06:07 | 00:12:37:12 | VIDEO |
| 00:00:46:09 | 00:00:04:24 | 00:08:21:08 | VIDEO |
| 00:00:49:17 | 00:00:02:25 | 00:01:23:11 | VIDEO |
| 00:00:51:25 | 00:00:02:20 | 00:19:31:22 | WILD AUDIO |
| 00:00:52:03 | 00:00:04:26 | 00:04:41:10 | VIDEO |
| 00:00:52:27 | 00:00:03:01 | 00:15:54:09 | WILD AUDIO |
| 00:00:55:13 | 00:00:04:21 | 00:11:40:27 | VIDEO |
| 00:00:59:26 | 00:00:06:08 | 00:15 21:08 | VIDEO |
| 00:01:05:08 | 00:00:07:27 | 00:06:44:12 | WILD AUDIO |
| 00:01:06:01 | 00:00:01:22 | 00:17:26:28 | VIDEO |
| 00:01:07:18 | 00:00:03:02 | 00:15:06:02 | VIDEO |
| 00:01:09:09 | 00:00:04:02 | 00:11:27:16 | VIDEO |
| 00:01:12:18 | 00:00:02:18 | 00:09:51:07 | VIDEO |
| 00:01:14:20 | 00:00:01:20 | 00:14:09:09 | VIDEO |
| 00:01:14:20 | 00:00:04:15 | 00:18:38:09 | WILD AUDIO |
| 00:01:15:22 | 00:00:02:15 | 00:03:34:16 | VIDEO |
| 00:01:17:18 | 00:00:04:19 | 00:03:00:26 | VIDEO |
| 00:01:18:29 | 00:00:05:19 | 00:17:57:28 | WILD AUDIO |
| 00:01:22:04 | 00:00:07:05 | 00:03:28:00 | VIDEO |
| 00:01:28:02 | 00:00:04:03 | 00:01:56:13 | VIDEO |
| 00:01:30:26 | 00:00:03:25 | 00:08:55:07 | VIDEO |
| 00:01:33:18 | 00:00:04:17 | 00:01:40:28 | VIDEO |
| 00:01:36:18 | 00:00:03:28 | 00:09:19:09 | VIDEO |
| 00:01:39:03 | 00:00:02:22 | 00:01:14:12 | VIDEO |
| 00:01:41:01 | 00:00:03:20 | 00:07:33:08 | VIDEO |
| 00:01:44:19 | 00:00:06:20 | 00:13:35:19 | VIDEO |
| 00:01:46:03 | 00:00:05:04 | 00:09:44:08 | WILD AUDIO |
| 00:01:50:29 | 00:00:06:29 | 00:19:26:14 | VIDEO |
| 00:01:56:06 | 00:00:06:21 | 00:17:15:15 | WILD AUDIO |
| 00:01:56:27 | 00:00:01:25 | 00:16:09:07 | VIDEO |
| 00:01:57:27 | 00:00:06:26 | 00:03:59:27 | VIDEO |
| 00:02:01:08 | 00:00:07:12 | 00:01:48:24 | WILD AUDIO |
| 00:02:03:08 | 00:00:05:04 | 00:16:06:07 | VIDEO |
| 00:02:07:02 | 00:00:07:21 | 00:04:58:07 | WILD AUDIO |
| 00:02:07:27 | 00:00:06:02 | 00:16:27:29 | VIDEO |
| 00:02:13:00 | 00:00:07:09 | 00:08:34:15 | VIDEO |

FIG. 3(cont)

| | | | |
|---|---|---|---|
| 00:02:18:21 | 00:00:04:21 | 00:01:20:00 | WILD AUDIO |
| 00:02:19:03 | 00:00:03:20 | 00:02:32:28 | VIDEO |
| 00:02:21:04 | 00:00:03:27 | 00:10:39:08 | VIDEO |
| 00:02:21:25 | 00:00:06:18 | 00:18:07:03 | WILD AUDIO |
| 00:02:24:04 | 00:00:05:16 | 00:19:51:03 | VIDEO |
| 00:02:28:07 | 00:00:03:05 | 00:06:50:23 | WILD AUDIO |
| 00:02:29:13 | 00:00:05:12 | 00:19:32:29 | VIDEO |
| 00:02:31:01 | 00:00:03:24 | 00:05:48:25 | WILD AUDIO |
| 00:02:33:17 | 00:00:05:01 | 00:14:38:24 | WILD AUDIO |
| 00:02:34:16 | 00:00:06:19 | 00:06:12:18 | VIDEO |
| 00:02:40:02 | 00:00:03:05 | 00:10:28:18 | VIDEO |
| 00:02:40:19 | 00:00:05:26 | 00:02:23:09 | WILD AUDIO |
| 00:02:42:19 | 00:00:05:17 | 00:04:44:14 | VIDEO |
| 00:02:47:18 | 00:00:04:12 | 00:13:44:11 | VIDEO |
| 00:02:50:06 | 00:00:04:21 | 00:02:49:02 | VIDEO |
| 00:02:54:21 | 00:00:01:21 | 00:16:14:13 | VIDEO |
| 00:02:56:06 | 00:00:02:24 | 00:14:14:25 | VIDEO |
| 00:02:57:06 | 00:00:04:02 | 00:14:17:25 | VIDEO |
| 00:02:59:19 | 00:00:02:06 | 00:13:58:04 | VIDEO |
| 00:03:00:19 | 00:00:08:29 | 00:16:28:05 | VIDEO |
| 00:03:07:18 | 00:00:02:24 | 00:07:07:18 | VIDEO |
| 00:03:08:28 | 00:00:06:26 | 00:13:54:25 | VIDEO |
| 00:03:12:14 | 00:00:08:08 | 00:08:41:17 | WILD AUDIO |
| 00:03:13:28 | 00:00:07:16 | 00:04:01:09 | VIDEO |
| 00:03:19:09 | 00:00:07:06 | 00:10:23:20 | WILD AUDIO |
| 00:03:20:27 | 00:00:04:21 | 00:10:43:01 | VIDEO |
| 00:03:23:25 | 00:00:06:12 | 00:17:48:12 | VIDEO |
| 00:03:28:10 | 00:00:05:24 | 00:12:22:29 | VIDEO |
| 00:03:32:15 | 00:00:04:15 | 00:08:14:23 | VIDEO |
| 00:03:32:23 | 00:00:07:06 | 00:05:01:04 | WILD AUDIO |
| 00:03:35:04 | 00:00:07:00 | 00:14:09:27 | VIDEO |
| 00:03:41:20 | 00:00:07:01 | 00:03:45:29 | VIDEO |
| 00:03:46:26 | 00:00:04:24 | 00:15:34:15 | VIDEO |
| 00:03:50:11 | 00:00:01:08 | 00:03:30:23 | VIDEO |
| 00:03:51:18 | 00:00:05:13 | 00:18:34:29 | VIDEO |
| 00:03:56:22 | 00:00:07:23 | 00:19:17:05 | VIDEO |
| 00:04:02:20 | 00:00:08:18 | 00:19:59:05 | VIDEO |
| 00:04:08:02 | 00:00:06:26 | 00:17:07:24 | WILD AUDIO |
| 00:04:09:09 | 00:00:04:09 | 00:05:42:04 | VIDEO |
| 00:04:13:13 | 00:00:04:02 | 00:17:28:15 | VIDEO |
| 00:04:17:10 | 00:00:07:21 | 00:18:32:09 | VIDEO |
| 00:04:19:07 | 00:00:06:14 | 00:14:06:14 | WILD AUDIO |
| 00:04:23:02 | 00:00:06:00 | 00:04:49:17 | VIDEO |
| 00:04:28:16 | 00:00:01:15 | 00:00:26:15 | VIDEO |
| 00:04:29:13 | 00:00:05:11 | 00:11:56:27 | WILD AUDIO |
| 00:04:29:24 | 00:00:08:05 | 00:19:23:29 | VIDEO |
| 00:04:36:10 | 00:00:02:01 | 00:07:39:20 | VIDEO |
| 00:04:37:14 | 00:00:07:23 | 00:06:21:26 | VIDEO |
| 00:04:38:17 | 00:00:04:15 | 00:17:10:25 | WILD AUDIO |
| 00:04:41:04 | 00:00:06:08 | 00:19:59:01 | WILD AUDIO |
| 00:04:44:12 | 00:00:07:14 | 00:06:27:11 | VIDEO |
| 00:04:49:27 | 00:00:01:28 | 00:16:02:09 | VIDEO |
| 00:04:51:07 | 00:00:06:12 | 00:13:25:12 | VIDEO |
| 00:04:52:18 | 00:00:02:26 | 00:13:22:09 | WILD AUDIO |
| 00:04:54:25 | 00:00:03:03 | 00:16:11:15 | WILD AUDIO |
| 00:04:56:17 | 00:00:06:20 | 00:01:05:26 | VIDEO |

FIG. 4

| COMMAND TIME | PROGRAM TIME | TIME CODE | VTR | |
|---|---|---|---|---|
| 00:00:00:00 | 00:00:09:12 | 00:19:59:18 | 1 | |
| 00:00:00:00 | 00:00:14:17 | 00:16:40:27 | 2 | |
| 00:00:00:00 | 00:00:15:25 | 00:14:00:03 | 3 | |
| 00:00:00:00 | 00:00:18:09 | 00:07:07:04 | 4 | |
| 00:00:00:00 | 00:00:18:16 | 00:12:51:08 | 5 | |
| 00:00:00:00 | 00:00:23:27 | 00:04:04:27 | 6 | |
| 00:00:00:00 | 00:00:27:04 | 00:17:55:04 | 7 | 200 |
| 00:00:00:00 | 00:00:27:06 | 00:08:24:09 | 8 | |
| 00:00:00:00 | 00:00:29:12 | 00:03:02:07 | 9 | |
| 00:00:00:00 | 00:00:35:18 | 00:00:59:10 | 10 | |
| 00:00:00:00 | 00:01:31:16 | 00:03:28:00 | 11 | |
| 00:00:00:00 | 00:01:37:14 | 00:01:56:13 | 12 | |
| 00:00:15:10 | 00:01:24:02 | 00:18:38:09 | 1 | 202 |
| 00:00:17:02 | 00:01:09:08 | 00:15:21:08 | 2 | |
| 00:00:18:22 | 00:01:02:09 | 00:15:54:09 | 3 | |
| 00:00:25:26 | 00:00:36:06 | 00:07:29:19 | 4 | |
| 00:00:26:26 | 00:00:44:17 | 00:10:37:29 | 5 | |
| 00:00:28:17 | 00:00:40:05 | 00:04:21:06 | 6 | |
| 00:00:30:29 | 00:00:41:18 | 00:18:26:26 | 7 | |
| 00:00:33:07 | 00:00:50:08 | 00:12:37:12 | 8 | |
| 00:00:37:21 | 00:00:47:25 | 00:03:03:03 | 9 | |
| 00:00:40:20 | 00:00:55:21 | 00:08:21:08 | 4 | |
| 00:00:42:18 | 00:00:58:29 | 00:01:23:11 | 10 | |
| 00:00:45:09 | 00:01:01:15 | 00:04:41:10 | 6 | |
| 00:00:49:13 | 00:01:01:07 | 00:19:31:22 | 7 | |
| 00:00:51:06 | 00:01:04:25 | 00:11:40:27 | 5 | |
| 00:00:53:05 | 00:01:18:21 | 00:11:27:16 | 9 | |
| 00:00:56:15 | 00:01:15:13 | 00:17:26:28 | 8 | |
| 00:01:00:15 | 00:01:14:20 | 00:06:44:12 | 4 | |
| 00:01:01:24 | 00:01:27:00 | 00:03:00:26 | 10 | |
| 00:01:03:27 | 00:01:24:02 | 00:14:09:09 | 7 | |
| 00:01:05:10 | 00:01:17:00 | 00:15:06:02 | 3 | |
| 00:01:06:11 | 00:01:25:04 | 00:03:34:16 | 6 | |
| 00:01:09:16 | 00:01:22:00 | 00:09:51:07 | 5 | |
| 00:01:15:16 | 00:06:43:21 | 00:01:56:13 | 2 | |
| 00:01:17:05 | 00:01:28:11 | 00:17:57:28 | 8 | |
| 00:01:20:02 | 00:02:05:18 | 00:17:15:15 | 3 | |
| 00:01:22:17 | 00:02:06:09 | 00:16:09:07 | 4 | |
| 00:01:22:23 | 00:01:50:13 | 00:07:33:08 | 9 | |
| 00:01:24:18 | 00:01:40:08 | 00:08:55:07 | 5 | |
| 00:01:25:22 | 00:01:46:00 | 00:09:19:09 | 7 | |
| 00:01:27:19 | 00:01:48:15 | 00:01:14:12 | 6 | |
| 00:01:28:17 | 00:02:00:11 | 00:19:26:14 | 1 | |
| 00:01:31:19 | 00:01:43:00 | 00:01:40:28 | 10 | |
| 00:01:34:00 | 00:01:54:01 | 00:13:35:19 | 8 | |
| 00:01:38:21 | 00:06:37:23 | 00:03:28:00 | 11 | |
| 00:01:41:17 | 00:02:42:29 | 00:14:38:24 | 12 | |
| 00:01:44:03 | 00:01:55:15 | 00:09:44:08 | 5 | |
| 00:01:47:17 | 00:02:10:20 | 00:01:48:24 | 10 | |
| 00:01:49:28 | 00:02:12:20 | 00:16:06:07 | 7 | |
| 00:01:51:07 | 00:02:07:09 | 00:03:59:27 | 6 | |
| 00:01:54:03 | 00:02:16:14 | 00:04:58:07 | 9 | |
| 00:02:00:19 | 00:02:22:12 | 00:08:34:15 | 5 | |
| 00:02:00:21 | 00:02:17:09 | 00:16:27:29 | 8 | |
| 00:02:07:10 | 00:02:40:13 | 00:05:48:25 | 1 | |
| 00:02:08:04 | 00:02:30:16 | 00:10:39:08 | 4 | |
| 00:02:12:09 | 00:02:33:16 | 00:19:51:03 | 3 | |
| 00:02:14:05 | 00:02:28:15 | 00:02:32:28 | 6 | |
| 00:02:17:24 | 00:02:31:07 | 00:18:07:03 | 7 | |
| 00:02:18:02 | 00:02:28:03 | 00:01:20:00 | 10 | |

FIG. 4 (cont)

| | | | |
|---|---|---|---|
| 00:02:23:11 | 00:02:38:25 | 00:19:32:29 | 8 |
| 00:02:24:05 | 00:02:37:19 | 00:06:50:23 | 9 |
| 00:02:29:21 | 00:02:43:28 | 00:06:12:18 | 5 |
| 00:02:32:05 | 00:02:50:01 | 00:02:23:09 | 6 |
| 00:02:32:24 | 00:02:52:01 | 00:04:44:14 | 10 |
| 00:02:34:13 | 00:02:49:14 | 00:10:28:18 | 4 |
| 00:02:37:25 | 00:02:57:00 | 00:13:44:11 | 7 |
| 00:02:39:02 | 00:03:10:01 | 00:16:28:05 | 3 |
| 00:02:40:24 | 00:03:06:18 | 00:14:17:25 | 9 |
| 00:02:44:07 | 00:03:05:18 | 00:14:14:25 | 8 |
| 00:02:44:07 | 00:02:59:18 | 00:02:49:02 | 1 |
| 00:02:48:00 | 00:03:04:03 | 00:16:14:13 | 12 |
| 00:02:50:17 | 00:04:46:26 | 00:06:21:26 | 5 |
| 00:02:52:19 | 00:03:09:01 | 00:13:58:04 | 4 |
| 00:02:55:27 | 00:04:38:25 | 00:11:56:27 | 6 |
| 00:02:57:18 | 00:03:17:00 | 00:07:07:18 | 10 |
| 00:03:01:12 | 00:03:21:26 | 00:08:41:17 | 7 |
| 00:03:04:09 | 00:03:23:10 | 00:04:01:09 | 1 |
| 00:03:05:24 | 00:03:51:02 | 00:03:45:29 | 12 |
| 00:03:08:12 | 00:03:18:10 | 00:13:54:25 | 8 |
| 00:03:10:20 | 00:03:30:09 | 00:10:43:01 | 9 |
| 00:03:11:07 | 00:03:28:21 | 00:10:23:20 | 4 |
| 00:03:19:00 | 00:03:33:07 | 00:17:48:12 | 3 |
| 00:03:19:24 | 00:03:44:16 | 00:14:09:27 | 10 |
| 00:03:25:06 | 00:03:37:22 | 00:12:22:29 | 8 |
| 00:03:30:04 | 00:03:41:27 | 00:08:14:23 | 7 |
| 00:03:30:26 | 00:03:42:05 | 00:05:01:04 | 1 |
| 00:03:35:00 | 00:03:59:23 | 00:03:30:23 | 9 |
| 00:03:35:27 | 00:04:01:00 | 00:18:34:29 | 4 |
| 00:03:39:19 | 00:03:56:08 | 00:15:34:15 | 3 |
| 00:03:43:16 | 00:04:06:04 | 00:19:17:05 | 8 |
| 00:03:46:12 | 00:04:37:28 | 00:00:26:15 | 7 |
| 00:03:49:11 | 00:04:32:14 | 00:04:49:17 | 1 |
| 00:03:51:16 | 00:04:12:02 | 00:19:59:05 | 10 |
| 00:03:58:03 | 00:04:28:19 | 00:14:06:14 | 12 |
| 00:04:01:01 | 00:04:18:21 | 00:05:42:04 | 9 |
| 00:04:01:02 | 00:04:17:14 | 00:17:07:24 | 3 |
| 00:04:06:13 | 00:04:22:25 | 00:17:28:15 | 4 |
| 00:04:13:27 | 00:04:26:22 | 00:18:32:09 | 8 |
| 00:04:20:20 | 00:05:02:00 | 00:13:22:09 | 10 |
| 00:04:23:00 | 00:04:45:22 | 00:07:39:20 | 9 |
| 00:04:24:10 | 00:04:50:16 | 00:19:59:01 | 3 |
| 00:04:26:27 | 00:04:39:06 | 00:19:23:29 | 4 |
| 00:04:34:13 | 00:04:47:29 | 00:17:10:25 | 8 |
| 00:04:35:03 | 00:04:59:09 | 00:16:02:09 | 12 |
| 00:04:38:14 | 00:04:53:24 | 00:06:27:11 | 1 |
| 00:04:39:13 | 00:05:05:29 | 00:01:05:26 | 7 |
| 00:04:44:06 | 00:05:00:19 | 00:13:25:12 | 6 |
| 00:04:47:11 | 00:05:41:25 | 00:00:59:10 | 4 |
| 00:04:47:23 | 00:05:35:19 | 00:03:02:07 | 9 |
| 00:04:52:14 | 00:05:04:07 | 00:16:11:15 | 8 |
| 00:04:54:19 | 00:05:33:13 | 00:08:24:09 | 5 |
| 00:04:56:24 | 00:05:15:19 | 00:19:59:18 | 3 |
| 00:05:01:07 | 00:05:33:11 | 00:17:55:04 | 12 |
| 00:05:01:08 | 00:05:24:16 | 00:07:07:04 | 1 |
| 00:05:04:26 | 00:05:22:02 | 00:14:00:03 | 10 |
| 00:05:07:01 | 00:05:24:23 | 00:12:51:08 | 6 |
| 00:05:07:10 | 00:05:20:24 | 00:16:40:27 | 8 |
| 00:05:12:19 | 00:05:30:04 | 00:04:04:27 | 7 |

204

METHOD AND APPARATUS FOR PLAYING SERIALLY STORED SEGMENTS IN AN ARBITRARY SEQUENCE

Appendix A is being submitted with the application for entry and availability in the application file, but for convenience, has not been submitted for publication. The appendix is available on microfiche. There is one microfiche and a total of twenty-one frames. The header portion and title page of the microfiche indicate Kenneth C. Kiesel as the inventor and MOM-015 as the attorney's docket number.

BACKGROUND OF THE INVENTION

The invention relates generally to editing serially stored audio-visual information and in particular to a method and apparatus for playing back the serially stored material according to a selected sequence.

Copending applications U.S. Ser. No. 452,287 entitled "Video Composition Method and Apparatus", filed Dec. 22, 1982, now U.S. Pat. No. 4,538,188, and U.S. Ser. No. 556,539, entitled "Improved Video Composition Method and Apparatus", filed Dec. 2, 1983, disclose apparatus and methods for creating an edit decision list (EDL). The EDL identifies a continuous edited sequence of video and audio segments, drawn from unedited, raw source material, which together can define a complete program.

The preparation of the edit decision list requires many hours of work wherein the entire program or portions of the program are viewed repeatedly for technical and esthetic content. According to the above-identified applications, however, the editing process advantageously does not physically form new sequences of video segments each time an edit decision is made; but instead, the edit decisions are recorded in a digital memory, and the resulting selected scenes, defined by the EDL, are thereafter played back in the desired sequence. To accurately assess the effect of the sequence of segments, the sequences must be displayed, preferably in a contiguous fashion, from beginning to end, and should be capable of being repeatedly replayed.

One method of playing the sequence of segments according to the EDL is to create a master tape with the segments written thereon in the proper order. However, continuous rewriting of the master tape each time a new edit decision is made or each time a sequence is to be viewed, is to be avoided, and desirably another method should be provided for playing back the segments according to the EDL. When there are only a small number of segments to be played, for example three or four, each segment can be read from a different one (or two) of the many tape recorders which are available (according to the above-identified patent applications), and the segments can be played in sequence as the video tape recorders rewind to the beginning of a segment each time the segment has completed playing. If a video tape recorder does not have sufficient time to rewind and still play the segment when it is needed, two recorders can operate in serial sequence so that for small sequences of segments the problem is not severe and can be relatively easily handled.

On the other hand, when viewing an EDL having a long sequence of segments, for example when there are more segments than there are video tape recorders, it can result that absent proper organization, gaps develop in the playback of the segments which not only break concentration with respect to the portion of the sequence being viewed, but have the potential effect of disrupting the entire playback sequence. As noted above, it is not practical to record the segments, in accordance with the EDL, in a desired sequential order onto an output video tape recorder from the various source video tape recorders because that procedure is both time consuming and inflexible. If an editor changes the program after he has made the output tape recording, he must rerecord the entire program from the point of the change to the end of the program material. This is different, for example, than film editing, wherein shots or segments can be changed by simply pulling out an old shot and splicing a new one in its place.

It is therefore an object of the invention to provide reliable and flexible playback of audio-visual source material which enables a sequence of segments on an edit decision list to be played back in a generally contiguous, arbitrary order. Other objects of the invention are creating a contiguous display of selected segments of audio-visual source material and displaying a sequence of segments after modification of the sequence without rewriting the modified segments on a new tape and without physically cutting and rejoining them.

SUMMARY OF THE INVENTION

The invention relates to a method for playing a plurality of segments selected from a plurality of reference segments in a selected playback sequence. The reference segments are recorded in the same order on each of a plurality of serial recording media and the selected segments are to be played in the playback sequence in an order which is different than the order of the reference segment recorded sequence. Each selected segment has associated therewith data representing a segment length and a starting position on the recording medium.

The method features the steps of playing a first selected segment of the playback sequence from a first medium reading device; playing each next succeeding segment of the playback sequence from a medium reading device which can reach that next succeeding segment in the contiguous playback sequence and play that segment in a called-for proximate time sequence to a preceding segment of the playback sequence; provided, however, that that reading device is the one which most recently completed a play of an earlier segment of the sequence. If there is no reading device able to reach and play the next succeeding segment of the playback sequence, then a previously unused reading device is employed for playing that next succeeding segment.

The method further features replaying the entire playback sequence by playing each next succeeding segment of the playback sequence from the reading device which can both reach that next succeeding segment in the second play of the playback sequence and play the next segment in a called-for proximate time sequence to a preceding segment of the playback sequence and which is the reading device which most recently completed a play of an earlier segment. In one embodiment of the invention, if no previously used reading device is available to play the next succeeding segment of the playback sequence, a previously unused reading device can be employed.

The method further features the steps of preprocessing a reading device play sequence for each of the playback sequence segments, assigning to each selected segment a command time, a program time, and a specified reading device for playing the selected segment at the program time, and directing to the specified reading device, at each command time, the instructions required to play the corresponding selected segment in timed sequence with the other of the selected segments.

In another aspect, instead of using previously unused reading devices during the replaying step, the method features inserting a pause delay between successive playbacks of the segment playback sequence for enabling the second and succeeding playbacks to be played without gaps between the played segments. The duration of the pause delay is sufficient to enable those reading devices employed during the first play to reach and play the playback segments in the contiguous playback sequence.

In yet another aspect of the invention, the method features minimizing the time duration prior to which a first playback of the selected segments in the playback sequence can take place. The time minimization process is implemented by selecting the reading devices in accordance with a play minimization procedure.

BRIEF DESCRIPTION OF THE DRAWINGS

Other objects, advantages, and features of the invention will appear from the following description of a preferred embodiment taken together with the drawings in which:

FIG. 2 is a flow chart illustrating one preferred operation of the control element in accordance with a preferred embodiment of the invention;

FIG. 3 is a table of inputs for generating the command list of FIG. 4;

FIG. 4 is a table showing a command list for the embodiment of FIG. 1; and

DESCRIPTION OF A PREFERRED EMBODIMENT

Figures 1, 5:
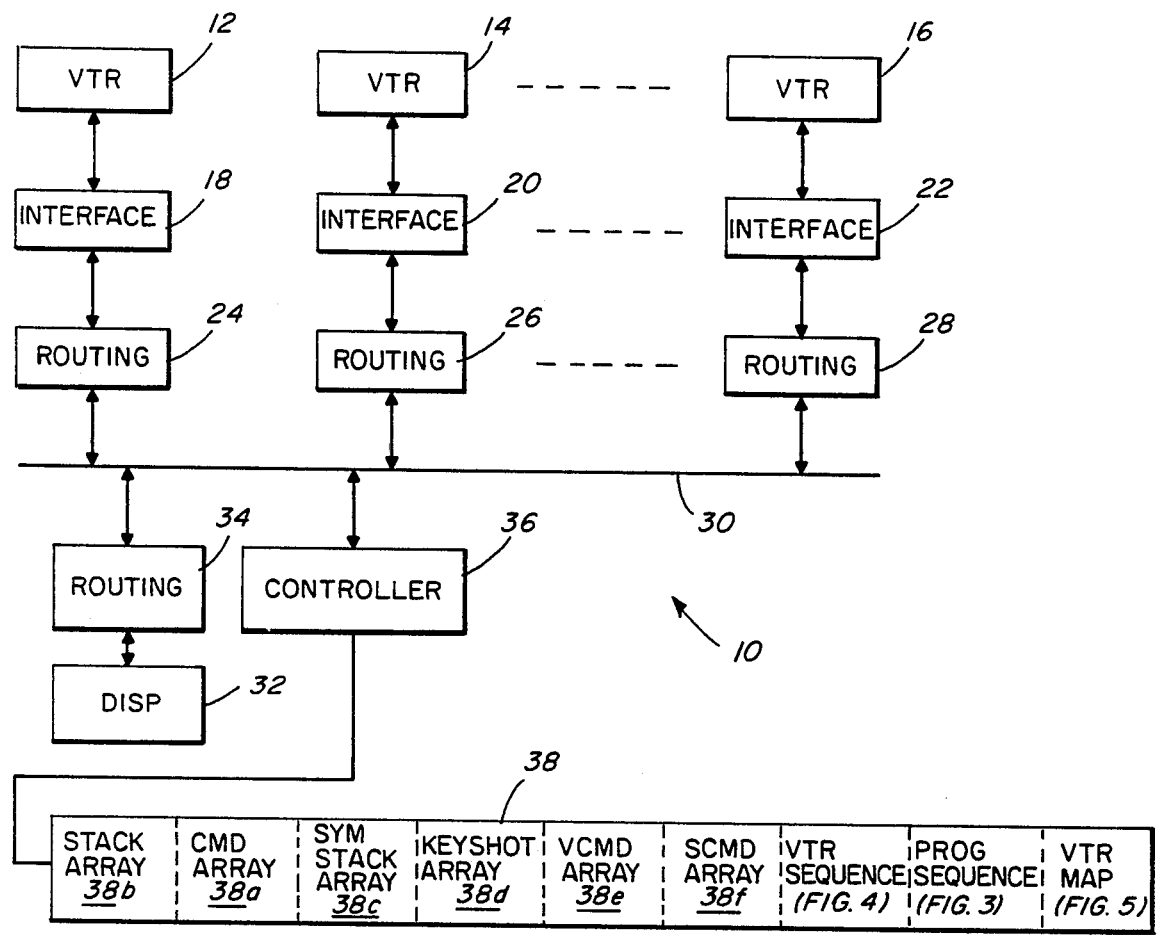
FIG. 1 is an electrical block diagram of a preferred embodiment of the invention.
FIG. 5 is a table of logical and physical VTR correspondence for the embodiment of FIG. 1.

Referring to FIG. 1, a playback apparatus 10 comprises a plurality of video tape recorders 12, 14, ..., 16 which connect through respective interface elements 18, 20, ..., 22, and routing elements 24, 26, ..., 28 to an audio-visual bus 30. Also connected to the bus 30 is a display element 32 connected through a routing element 34 and a controller 36 with a memory 38. The controller 36 can communicate over the bus 30 to any of the video tape recorders and any of the video tape recorders can make their audio and video signals available to the display element 32 through the bus 30.

In general operation, under the control of controller 36, the different VTR's are queued to play respective segments of a commonly stored sequence of segments in a prescribed playback sequence; and the output signals of the respective VTR's are switchably connected for display over display unit 32. Thus, as soon as one VTR finishes playing a segment, the display element 32 receives a next segment for display from a second VTR. The first VTR is then sent to another segment further along in the playback sequence and plays that segment in its prescribed slot in the playback sequence. In accordance with this apparatus and method, the playback sequence can be easily changed at the controller 36 by modifying its edit decision list and the instructions to the various video tape recorders are modified accordingly. Rerecording of the source material is not needed.

In typical operation, all of the video tape recorders are identical and have recorded thereon the same program material in the same recorded order. Thus each video tape recorder can play any of the material in the program. The tapes can be removed to allow another editor to use the equipment and can then be reinserted later into any of the VTR's. It is not necessary to remember from which VTR a tape was removed.

Furthermore, this structure has the advantage that, if a video tape recorder breaks down, it can be removed from the system "logically" (as opposed to physically) and the program can still be displayed so long as there are a sufficient number of video tape recorders left to reach all of the segments in time. The operator needs only to be alerted to the fact that maintenance is required, but need not react quickly.

The VTR's 12, 14, ..., 16 can be any type of video tape player. If a broadcast quality VTR is used, the program can be aired directly without ever generating an output tape. Otherwise, for example, the edit decision list from which the video tape recorder instructions are being derived can control an editing machine to automatically create an output tape using broadcast quality source material.

In accordance with the invention, each video frame of source material is identified by a standard SMPTE time code. Time sequential video frames are recorded using sequential time code, but gaps in the time code can exist if, for example, the camera starts and stops. Therefore, in accordance with the invention, when material is stored on each of the VTR's, each frame has recorded with it, in addition to the original source time code, an internal time code which is numbered sequentially from the beginning of tape until its end. As will be described in more detail below, the internal time code is essential for playing the edited material because it provides the data which determines the distance of any video tape recorder from the desired material. That is, by taking the difference between the internal time code of the desired material and that of the frame currently under a tape head, the distance and hence the time to (a) reach the desired material and (b) properly set up to play it, can be determined.

The playback data source for the apparatus in this illustrated embodiment of the invention is the edit decision list. The edit decision list is created as the input source material is edited and represents a list of the edit points, that is, a list of the segments which are to be displayed and the order in which the segments are to be displayed. In the illustrated embodiment, the parameters representing each segment to be displayed include the internal time code for the video frame which is the first frame of the segment (FOOTAGE), the program time (PROGTIME) which is the time from the beginning of the program to the beginning of the segment, a description of the material which is going to be played (audio or video) and a description of the transition from one segment to a next. An additional item of data, the length of time that a video tape player must play to provide the program material of the segment (PLAYTIME), is calculated from the parameters of the edit decision list. Therefore, for cut transitions, the program PLAYTIME is simply the difference between the beginnings (the program times) of two successive segments. For dissolves and wipes, the PLAYTIME for the earlier segment is extended by the length of the transition.

For ease of description, the special case of audio follow video is generally described hereinafter, that is, the audio must always come from the same VTR that is displaying a picture. Clearly, in other embodiments of the invention, other cases wherein the audio and video come from separate video tape recorders can be employed.

Controller 36 receives, for each segment to be displayed, the program time, the internal time code data (FOOTAGE) identifying the beginning of the segment, and the length of the segment (PLAYTIME). Controller 36, in response thereto, generates a logical list of the video tape recorders which will be employed to play the segments in the correct order. This logical list of VTR's is created without reference to the physical VTR's except that the response time and number of the physical VTR's are available to the controller. The logical video tape recorders are identified with an identifying symbol, for example starting with the number "1" and continuing sequentially thereafter.

With that data available, controller 36 then operates, as will be described in more detail below, to generate an ordered list of logical video tape recorder commands, each entry of the list (called the COMMAND array 38a and stored in memory 38) having inter alia a command time, a time code (FOOTAGE), a program time, and the logical VTR ID number. The command time is the time from the first command time to the time at which the current command is to be sent. This time is calculated to be immediately after a video tape recorder has finished playing a previous program segment. The first command to each of the tape recorders used to play the program is sent at command time zero. As described in more detail below, controller 36 generates, once the various lists of logical video tape recorders has been prepared for playing the program, an association between the logical video tape recorders and the physical tape recorders which will actually play the program material. The use of an artificial grouping of tape recorders, the logical units, provides great flexibility to the method described herein.

The time code or FOOTAGE of a segment, as noted above, is the internally applied time code of the first video frame which the video tape recorder receiving a command must play to show the program segment which it is being directed to play. That first frame must be shown at the identified PROGTIME and hence the video tape recorder must have a controlling interface which is capable of locking the tape recorder to a system synchronization clock signal and queuing the tape recorder ahead of the program time so that it will be playing at a particular location at the specified program time. The logical video tape recorder identification number is a number from one to the number of video tape recorders available to the system, and identifies the logical video tape recorder to which a command will be sent.

The controller 36 also requires, for each physical video tape recorder, the position of the tape, for that tape recorder, i.e., the internal time code for the frame under the tape head. With this data, controller 36 also generates as described in more detail below, a look-up table or VTR map (FIG. 5) to associate each physical video tape recorder with a logical video tape recorder identified in the command list. The look-up table has available the identifying symbol of the physical video tape recorder corresponding to each logical video tape recorder identification. In addition, the look-up table of FIG. 5 also provides a mapping from one logical video tape recorder identification (VTR ID) to a next logical VTR ID for use during a next play of the same playback sequence. In this manner, a playback sequence can repeat indefinitely by issuing commands from the command list in a cyclic pattern and substituting, after a command has been issued, the next logical VTR number from the look-up table for the logical VTR number then in the command list.

The controller 36 can also supply three additional items of information. The controller 36 can provide a loop time (LOOPTIME) which is the time from the start of a program the first time it is displayed, until the start of the program the second time it is displayed. This time is then added to the command time and program times for each command after it is issued to prepare the command for a next use when repeatedly cycling through the command list to replay the program sequence. In addition, the controller 36 provides a delay time (DELAY) which is the time from the issuance of the first commands corresponding to command time of zero until the start of the program. The physical video tape recorders are chosen, as described below in greater detail, by controller 36 to play the first segments in an optimum pattern based upon their initial positions relative to the program material. This minimizes the DELAY. Finally, controller 36 also provides a time pause (PAUSE) which is the time from the end of a program until the beginning of the next display of the program when the program is replayed. The controller typically assigns a predetermined value to the time pause, but extends it if necessary when the video tape recorders used to play the program the first time require a time longer than the predetermined value to initiate play of the program a next time. As will be described further below, once the time pause is set, the programs can be displayed repeatedly without further time pause adjustment.

Referring now to the flow chart of FIG. 2, which corresponds to the program listing of Appendix A being submitted herewith, controller 36 operates as follows. The controller receives, at 100, the initial data describing the playback sequence. The input data is in the form of a PAIR structure which includes inter alia the starting location of the video and audio material, the level or intensity of the audio material, and the duration of the material. As described in more detail in copending application U.S. Ser. No. 556,539, filed Dec. 2, 1983, and assigned to the assignee of this application, the specification of which is incorporated herein by reference, the PAIR structure is a doubly linked list, internally generated, which includes data indicating the previous segment to be played and the succeeding segment to be played. The contents of application Ser. No. 556,539 are included in and have been published by WIPO as a Patent Cooperation Treaty Application under Publication No. WO84/02606, on July 5, 1984.

The controller 36 operates upon the input data at 102 to prepare a "COMMAND array" 38a. The COMMAND array entries include, for each segment to be played, (a) the program time (PROGTIME) at which the segment is to begin play in its proper position in the playback sequence; (b) the play time (PLAYTIME) or length of the segment; (c) the command time (CMDTIME), which is the time at which the command to play a segment (the command including the PROG- TIME, etc.) is sent to a playback device, that is, a selected video tape recorder through its associated routing and interface circuitry; (d) the end time (ENDTIME) which is the time at which the segment is completed; (e) the footage (FOOTAGE) which is the start time code for the segment on the video tape (this is the internally added time code); (f) a PAIR pointer (PAIRP) which is a pointer to the PAIR associated with the segment to enable the controller 36 to obtain further data and information if necessary; (g) the reading device logical identification (VTRID) which is the identification of the logical VTR to be used to play the segment; (h) the VTR use flag (VTRNEW) which is a flag set when a previously unused reading device is first used and hence is set for all entries of the array when all VTR's have been used; and (i) the transition duration (TRANDUR) which is the length or duration of the transition occurring at the end of this segment. Not all of the items in the COMMAND array will be available when the list is first set up. Those items which are not available will be added to and filled in the COMMAND array list as the data becomes available. Thus, for example, when the COMMAND array is first set up, the VTRID is unknown, as are for example the command times and the end times.

The controller 36 next generates, at 104, a STACK array 38b in memory 38. The STACK array provides data representing the starting position for each of the physical reading devices, that is, the physical video tape recorders. The STACK array for each physical video tape recorder includes the entries "STATUS" which equals zero if the VTR has not been assigned to play a segment, a POSITION data indicating the initial position of the VTR on the tape, an IDENT variable which identifies the logical position of the VTR in the stack, and DONETIME, the time at which the video tape recorder is ready for a next command. In addition, a corresponding array called a SYMSTACK array 38c (stored in memory 38) is generated which includes, for each logical VTR, an identifier corresponding to the identifier IDENT in the stack array, the DONETIME, a POSITION parameter which is the head position on the tape, and a STATUS parameter indicating whether the logical VTR has been previously assigned.

The controller 36 then builds, at 106, a list of "logical" reading devices or VTR's which can play the sequence of segments for the first time (see also FIG. 4). As the list of logical VTR's is being generated, the apparatus also builds a KEYSHOT array 38d in memory 38. The list of "logical" video tape recorders to play a program has the same length as the input list of segments to be played. The identification of which logical VTR plays which segment uses VTR identification numbers which increase sequentially and start with "one", and produces a symbolic list which is thereafter associated with physical VTR's.

The inputs employed for generating the symbolic list of logical VTR's is shown for example in FIG. 3. The inputs provide the program time (PROGTIME), the segment length or duration (PLAYTIME), and the location or time code (FOOTAGE) at which the material appears on the tape. The material can be video or audio and in this illustrated example it is assumed that both channels of audio which are available from the tape recorders are employed together. In accordance with the invention therefore, a first "logical" VTR, labeled VTR 1, is employed to play the first shot which starts at program time zero. Referring to the resulting symbolic list of FIG. 4, it is noted that the list has four elements for each list entry, the command time (CMDTIME), the program time (PROGTIME), the time code (FOOTAGE), and the logical VTR identification VTRID. Further, as noted, the command to play the first segment is sent to the VTR at time zero and has a time code (FOOTAGE), that is, the location of the segment on tape, which corresponds to the first entry of the program sequence. The program time, however has changed from "zero" because it takes a certain "set-up" time (DELAY) before which all of the physical VTR's can reach their assigned initial segment. As will be described in more detail below, that DELAY in the present example is twenty-three seconds and eight frames. While the determination of that time is described below; it is noted here that the program time for each entry in the VTR sequence is incremented by nine seconds and twelve frames from that which appears in the program sequence FIG. 3.

As the VTR sequence (the command list) of FIG. 4 is being created, the data, previously unavailable, is also being entered into the COMMAND array. For example, the VTRID and CMDTIME for each of the logical tape recorders is being entered for a sequence. Similarly, entries are made in the SYMSTACK array. For example, the DONETIME, the time when a logical VTR is finished playing a previous segment is entered in the SYMSTACK array, and indicates when that logical VTR will be available for assignment to a next segment. Initially, the DONETIME entry is set to a large negative number so that initially any logical tape recorder has ample time to reach any of the source material.

The second segment entry on the program sequence listing of FIG. 3 cannot be played by the first tape recorder. Thus, a second tape recorder, identified as VTR 2, is assigned to play the second entry. For each succeeding entry of the program sequence, a search path is followed through the list of video tape recorders to find the one that can play the next segment. If a previously used VTR can play the next segment, the most recently used and available VTR is chosen for the task. Otherwise a new VTR, assigned the next higher identification number is assigned to play the next segment.

As noted above, the program sequence list is "searched" in the order specified by the sequence, and a logical video tape recorder is found which can reach the segment in time to play it. To determine whether a video tape recorder can reach the material in time, a model of the video tape recorder response time is generated and stored in the controller 36. The model, in this illustrated embodiment, is arrived at by experiment and will be different for different models of video tape recorders. For a Sony tape recorder Model SL-2700, the time consists of a fixed overhead time "D" and a fixed ratio, "S", of the fast wind speed to the play speed. Thus, the time T needed by a video tape recorder at position P to play material at a location "M" becomes $$T = D + (|P - M|/S).$$

If T is less than (PROGTIME-DONETIME) for a VTR, that VTR can be employed for that item on the program sequence. If the VTR can be employed, an entry is made in the COMMAND array with the program time, the play time, and the time code copied from the input data and the logical identification number of the VTR. If no previously used video tape recorder in the list can play the material, a new, previously unused VTR is employed and is assigned the next higher VTR ID number. Similar entries are made in the SYMSTACK array, as is appropriate.

In accordance with the method employed by controller 36, VTR's which have been used once are first tested, and in an order so that the most recently used VTR is checked first. This method provides the other used VTR's a longer time to reach material that may be farther from their DONETIME positions. When a VTR is found, its "DONETIME" in the SYMSTACK array is changed to "PROGTIME+PLAYTIME", that is, the time when the VTR becomes available again for reassignment will be the time after which it finishes playing the newest segment to which it has been assigned. In this manner the VTR sequence of FIG. 4 and the associated arrays are built by the controller 36. In the example of FIG. 4, fourteen VTR's are available, however, only twelve VTR's are actually used. If no VTR can be found to play a next segment in continuous time sequence, the controller substitutes black video and silence for the segment.

As noted above, in connection with the logical block labeled 104, the SYMSTACK array is generated to describe the logical VTR's which have been employed in generating this VTR sequence. Thus, when the controller 36 scans the logical VTR's to determine whether one is available, it, in effect, scans the entries of the SYMSTACK array which includes both the DONETIME and POSITION of the logical VTR. In addition, of course, the SYMSTACK entry includes the status of the logical VTR which indicates whether or not it has been previously assigned.

When a VTR is assigned to play for the first time, the controller 36 also copies the command in a second list of commands called the KEYSHOT array. Since newly used VTR's are identified with increasing numbers, the N'th item in the KEYSHOT array will be the first use of the logical VTR identified by the number "N". Further, the number of items in the keyshot list will equal the number of VTR's used to play the program sequence. For the illustrated embodiment, the keyshot entries correspond to those entries labelled 200 in the FIG. 4 command list.

Once VTR's have been associated with all segments in the program sequence, and the corresponding data have been entered in the COMMAND array, a time pause is set, at 108, to a desired value, (for example three seconds) and the LOOPTIME (the time from the beginning of the first play of the sequence to the time of the beginning of the second play of the sequence) is set equal to the sum of the time pause (PAUSE) and the PROGTIME and the PLAYTIME for the last segment in the program sequence.

The controller 36 then generates a second list, also at 108, to ensure that the segments can be played a second time by the VTR's used to play them during the first play. That is not to say that the same "logical" VTR must play the same segment during the second play as it played during the first play, but that the same number of VTR's can be employed to play the segments a second time. A significant difference between the first and second play of the edit decision list segments is that the tape recorder heads, at the beginning of the second play are not in the same tape position as they were at the beginning of the first play; and therefore, the new positions may require not only that different tape recorders play different segments but that the time pause may have to be increased to allow all of the "old" or "used" tape recorders to replay the segments of the edit decision list in a contiguous playback sequence.

The controller 36 therefore searches, at 108, the list of logical video tape recorders for one that can play the first segment of the program during the second play. The criteria determining whether a video tape recorder can reach the segment corresponds to the criteria used in connection with the original or first play of the program, except that the allowable time by which to reach a segment now must be less than the sum of the program time for the segment (during the last play of sequence) plus the LOOPTIME minus the DONETIME (of the VTR). The search extends only as far as the logical video tape recorders which were used during the first play of the program. If no VTR can reach the material in time to play the segment in a continuous sequence, illustrated controller 36 selects, from among the VTR's which have not yet been used in this second play of the sequence, but which were used in connection with the first program play, and which comes closest in time to reaching the segment. Controller 36 then increases the loop time by increasing time pause by a time duration which allows the video tape recorder to reach the segment and play the material in contiguous sequence to the preceding segment (if any). The time duration added to the pause delay (PAUSE) is subtracted from the DONETIME associated with each other video tape recorder not yet used during this second play to reflect the extra time they will now have due to the longer time pause.

When a video tape recorder is used for the first time during the second play of the program sequence, the new logical number of that video tape recorder is inserted into a look-up table, the VTR map, (FIG. 5) as the "next VTR" to play the segment. This look-up table is explained in more detail below. Also, the VTR identification number in the corresponding keyshot is changed to the new logical VTR which was actually assigned during this next play.

The entries in the SYMSTACK array are then updated and the DONETIME of this VTR is set to a time equal to the PROGTIME of the segment during the previous play of the program, plus the PLAYTIME, plus the LOOPTIME. and the VTR is moved to the first position of the search path, i.e., the order in which the logical VTR's are searched to find one which can reach a next segment to be played.

Next, at 110, the LOOPTIME is added to the program time in all keyshots and the keyshot entries are appended to the command list (FIG. 4). The command list now contains all of the commands to play the program sequence the first time and the first command to each VTR for the second play of the program sequence.

Controller 36 now determines which physical video tape recorder to assign to each of the VTR logical identification numbers, and calculates the initial "DELAY", that is the time from the "zero" command time to the beginning of the first play of the program sequence. In the illustrated embodiment, the physical VTR assignment is effected as follows. First, sort at 112, the KEYSHOT array in order of increasing time code or FOOTAGE, and then sort, at 114, the video tape recorder list represented in the STACK array in order of increasing head position on the tape. Then, for each item in the KEYSHOT array, starting with the keyshot having the lowest time code, find, at 116, the physical video tape recorder whose head position is the closest to the required position. If it is not already assigned, assign it to play that keyshot and go on to the next keyshot entry in the array. If that closest video tape recorder is already assigned, and if all the VTR's to the end of the video tape recorder list have also previously been assigned to play a keyshot, find an unassigned video tape recorder which is closest to the end of the list and assign all video tape recorders from it to the next-to-last VTR in the list to play the keyshot previously assigned to the VTR sequentially ahead of it (toward the end of the list). Then assign the last video tape recorder on the list to play the current keyshot.

If at least one VTR from the closest VTR to the end of the VTR list has not been previously assigned, assign the first unassigned video tape recorder toward the end of the list to play the keyshot. Thereafter, to optimize the VTR assignment, controller 36 reviews the VTR assignments, and if there is an unused video tape recorder between the one just assigned and the beginning of the list, controller 36 computes (a) the longest delay, of any VTR in the consecutive group of assigned video tape recorders, in reaching its designated keyshot, (the consecutive group starting with the VTR just subsequent to the unused VTR and continuing to (but not including) the next unused VTR or the end of the list whichever occurs first) and (b) the longest delay of any video tape recorder, in the VTR group starting with the unused video tape recorder and continuing to the VTR prior to the last VTR of the consecutive group identified in (a), in reaching the keyshot assigned to the VTR one ahead of it. If the second computed delay is less than the first computed delay, controller 36 reassigns the keyshots to the video tape recorders used in computing the second delay. This procedure is followed until all of the keyshots have been assigned to a physical VTR.

Next, controller 36 computes, at 118, the DELAY time, which is the longest of the times for any assigned video tape recorder to reach the designated keyshot position reduced by the program time (PROGTIME) of that keyshot. This DELAY is then a time duration required to allow each of the video tape recorders to reach their first segment to be played (the associated keyshot) at a time before they are called upon to play that segment. It is this delay time which the apparatus will require prior to playing the first program sequence. Thereafter controller 36 assigns the VTR identification number of the logical video tape recorder previously assigned to play a keyshot to the corresponding physical VTR determined above for the keyshot. This correspondence is tabulated in the VTR map of FIG. 5 where the logical VTR identification is listed under "VTR1" and the physical VTR under "physical VTR". Further, for each command in the COMMAND array, the DELAY is added to the program time. As noted above, the adjustment to the PROGTIME's provides the video tape recorders sufficient time to reach their first segments before they are called upon to display them.

Next, the command time is entered, at 120, for each element in the COMMAND array. That is, for each element in the command array, starting with the last entry and working backwards toward the first entry, controller 36 searches backwards through that command array for the previous entry using the same video tape recorder. This previous entry then defines the last use the video tape recorder prior to the current command. If a prior use is found, the command time of the current element is the program time (PROGTIME) plus the play time (PLAYTIME) of the previous item.

If no prior use of the VTR is found, this entry corresponds is the first use the video tape recorder and therefore its command time is zero, that is, the command is sent immediately. This data is also stored in a second command array, designated the VCMD array 38e (in memory 38) and is used to create, at 122, a third command array, a switcher command array, (designated an SCMD array 38f in memory 38), which provides command data to the routing switching system described in the aforementioned U.S. Ser. No. 556,539 for properly connecting the VTR output at the correct time to render a precise display.

Thereafter, the video tape recorder command arrays VCMD and SCMD are sorted at 124 and 126 respectively, by increasing command time. The commands in each array are thus arranged in the order in which they will be issued. Duplicate commands are removed, for example, when audio and video are derived from the same VTR.

There are as many commands, in the VCMD array, with a command time equal to zero, as there are video tape recorders being used. These commands correspond to the keyshot list compiled for the first play of the program sequence. The keyshot list for the second play of the program sequence is also recorded at the end of the command time list for the for first play (see FIG. 4). The keyshot list thus has command times equal to zero only once, that is, at the start of the command sequence. After all commands in the command list (FIG. 4) have been issued and the segments played, all VTR's will have received their first commands for playing the program sequence the second time. This corresponds to the first commands for playing the keyshots a second time. As recited earlier, a sufficient delay or pause (PAUSE) is provided between plays of the program sequence to ensure that all tape recorders can reach the keyshot to which they are assigned during a second play in time to play the entire program. Thereafter, the next segment to be played is segment 202 which appears after the last keyshot of the first play. This then is the re-entry point for the command list after segment 204, the last segment of the list.

It is important to bear in mind that commands, as noted above, are issued to both the video tape recorders and their associated interfaces, as well as to the routing switching system circuitry described in U.S. Ser. No. 556,539. Thus, it is not enough to have the proper video tape recorder providing the required data at the right time, but in addition, the routing circuitry must be properly controlled to switch the output(s) of a video tape recorder onto the bus 30 at the correct time. In that manner, the video, for example available from a video tape recorder as it is getting up to speed, is not shown on the display but rather, at the routing circuit switching time, the old video from, for example VTR 12, is switchably removed off of bus 30 by the routing circuitry, and the video from, for example VTR 16, is switchably directed onto the bus by the routing circuitry. To accomplish this in synchronism, the apparatus employs as is described in the above-identified application, a master clock which synchronizes all of the VTR's, their interface elements, and associated routing elements.

The table of FIG. 5, under the column "VTR2" provides the identification of the second logical assignment of a VTR. Thus, in the illustrated example, logical VTR 9 during a first play is also logical VTR 9 during the first replay. However, for example, logical VTR 1 during a first replay is logical VTR 3 during a second replay. In this manner a sequence of "logical VTR's" can be implemented for each succeeding replay of the program sequence. Thus, logical VTR 2 becomes logical VTR 8 during a next replay, to logical VTR 5 during a second replay to logical VTR 6 during a third replay, to a logical VTR 7 during a fourth replay to a logical VTR 12 during a fifth replay, to a logical VTR 2 again during a sixth replay. Thereafter the sequence repeats.

In using the table of FIG. 5, the physical VTR's are always assigned to correspond to the same logical VTR number. Thus, as the logical VTR changes during subsequent plays of the same program material, so the video or audio segments provided by a particular physical VTR will change correspondingly. Accordingly, controller 36, to show the program sequence indefinitely, preferably modifies the command list after each command is issued, so that it will be valid for the next play of that segment of the program material, i.e. the next time the same segment is called for during a subsequent play of the material. The required modifications are (a) that the command time is updated by adding loop time to the old command time, (b) that program time is updated by adding loop time to the old program time, and (c) the logical and hence physical video tape recorder identifications are updated by using the VTR2 entry from the look-up table for the new logical VTR ID. The physical video tape recorder entry corresponding to the new logical VTR entry (using column VTR 1) identifies the physical VTR which will play the segment during the next play. The material will therefore be able to loop indefinitely, at 128, until interrupted by an externally generated command.

Additions, subtractions, deletions, and other modifications of the disclosed preferred embodiment of the invention will be apparent to those practiced in the art and are within the scope of the following claims.

What is claimed is:

1. A method for playing a plurality of segments, selected from a plurality of reference segments, in a user-defined playback sequence, said reference segments being recorded on each of a plurality of serial access recording media in a known recorded reference sequence, said selected segments being played in said playback sequence in an order different than the order of said recorded sequence, each selected segment having associated therewith data representing a segment length and a staring position on each said recording medium, said method comprising the steps of playing a first selected segment of said playback sequence from a first medium reading device, playing each next succeeding segment of said playback sequence from a medium reading device (a) which can reach said next succeeding segment in said contiguous playback sequence and play said succeeding segment in a desired time sequence relative to a preceding segment of said playback sequence, and (b) which is a reading device able to reach the succeeding segment, which most recently completed play of an earlier segment, and if no such previously used reading device is available to play said next succeeding segment of the playback sequence, is a previously unused reading device, replaying said entire playback sequence by playing each next succeeding segment of said playback sequence from a reading device (a) which can reach said next succeeding segment in said second play of said playback sequence and play said next succeeding segment in a desired time sequence relative to a preceding segment of said playback sequence, and (b) which is a reading device able to reach the segment, which most recently completed play of an earlier segment, preprocessing a reading device play sequence for each of said playback sequence segments, assigning to each selected segment a command time, a program time, and a specified reading device for playing said selected segment at said program time, directing to a said specified reading device at each said command time, instructions required to play a said selected segment in timed sequence with other of said selected segments, minimizing a time duration prior to which a first playback of segments in said playback sequence can take place by selecting said unused physical reading devices in accordance with a play delay minimization process, generating a list of commands, each entry of which corresponds to the first use of a reading device to play a said segment of said playback sequence, sorting the entries in said KEYSHOT array according to increasing time code, sorting the available reading devices in accordance with increasing head position on the recording medium, assigning for each successive KEYSHOT array entry, starting with the keyshot entry having the lowest time code, the physical reading device whose position is closest to the time code associated with the keyshot entry, selecting, if that reading device is already assigned, a second reading device so that if at least one reading device from the closest reading device to the end of the reading device list has not been previously assigned, the first unassigned reading device toward the end of the list is assigned to play the keyshot, and if the closest reading device is already assigned and if all reading devices to the end of the list of sorted reading devices have also been previously assigned to play a keyshot, the unassigned reading device which is closest to the end of the list is identified and all reading devices from it to the next to last reading device in the list are reassigned to play the keyshot previously assigned to the reading device sequentially ahead of it, and the last reading device of the list is assigned to play the current keyshot, and optimizing the reading device assignment by reviewing the reading device assignments.

2. The method of claim 1 further wherein said specified reading device is first assigned a logical identification, and said preprocessing step comprises the steps of preparing a look-up correspondence table for assigning a physical reading device to each said logical identification and for changing the logical identification associated with a specified reading device for each successive play of the sequence, and updating, using said correspondence table, said assigned logical reading device identification for each next segment play.

3. The method of claim 2 further comprising the step of selecting, for the second and each succeeding playback of said playback sequence segments, only the recording devices employed during the first play of said playback sequence segments.

4. The method of claim 1 wherein said optimizing step further comprises the steps of finding, if there is an unused reading device between the one just assigned and the beginning of the sorted reading device list, the shorter of the longest delay of any reading device in a consecutive group of assigned reading devices, which includes the closest reading device, in reaching its designated keyshot, and the longest delay of any reading device, from the unused reading device just prior to the consecutive group to the reading device which is the one before the end of the consecutive group of assigned reading devices, in reaching the keyshot assigned to the reading device one ahead of it, and reassigning the keyshot entries when the second computed delay is less than the first computed delay.

5. The method of claim 1 further comprising the step of employing, for the second and each succeeding play of said playback sequence segments, only the reading devices employed during the first play of said playback sequence segments.

6. The method of claim 5 further comprising the step of inserting a pause delay between successive playbacks of said segments in said playback sequence.

7. The method of claim 5 further wherein said replaying step comprises the steps of inserting a standard pause delay between successive playbacks of said playback sequence, increasing the duration of said pause delay whenever there is a next playback segment, during the second play, which none of the reading devices used during said first playback of said playback sequence is able to reach and play according to said proximate time sequence, said increased pause delay being provided for allowing a said reading device, used during said first play and not yet used during said second play, to reach and play said next playback segment in said playback sequence.

8. The method of claim 1 wherein each said reading device is a video tape recorder.

9. The method of claim 1 further comprising the step of recording a sequential time code when said serial access recording media are recorded with said reference segments whereby said sequential time code for any frame indicates its relative distance from the beginning of the recorded frames on said media.

* * * * *

Disclaimer 4,729,044 — Kenneth C. Kiesel, Wayland, Mass. METHOD AND APPARATUS FOR PLAYING SERIALLY STORED SEGMENTS IN AN ARBITRARY SEQUENCE. Patent dated Mar. 1, 1988. Disclaimer filed Mar. 21, 2002, by the assignee, LEX Computer & Management Corporation.

Hereby enters this disclaimer to all claims, of said patent.

*(Official Gazette, May 6, 2003)*